United States Patent
Tamilselvam et al.

(10) Patent No.: US 11,768,679 B2
(45) Date of Patent: Sep. 26, 2023

(54) IDENTIFYING MICROSERVICES FOR A MONOLITH APPLICATION THROUGH STATIC CODE ANALYSIS

(71) Applicant: International Business Machines Corporation, Armonk, NY (US)

(72) Inventors: Srikanth Govindaraj Tamilselvam, Chennai (IN); Utkarsh Milind Desai, Bangalore (IN); Amith Singhee, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 17/538,355

(22) Filed: Nov. 30, 2021

(65) Prior Publication Data

US 2023/0168887 A1    Jun. 1, 2023

(51) Int. Cl.
*G06F 9/44* (2018.01)
*G06F 8/75* (2018.01)
*G06F 8/41* (2018.01)

(52) U.S. Cl.
CPC ............... *G06F 8/75* (2013.01); *G06F 8/433* (2013.01); *G06F 8/447* (2013.01)

(58) Field of Classification Search
None
See application file for complete search history.

(56) References Cited

U.S. PATENT DOCUMENTS 10,430,250 B2  10/2019 Ishikawa et al.
10,637,952 B1   4/2020 Koenig et al.
(Continued)

FOREIGN PATENT DOCUMENTS

CN    109948710    6/2019
CN    112398899    2/2021
(Continued)

OTHER PUBLICATIONS

Mell, Peter, et al., The NIST Definition of Cloud Computing, National Institute of Standards and Technology, U.S. Department of Commerce, NIST Special Publication 800-145, Sep. 2011.
(Continued)

*Primary Examiner* — Anna C Deng
(74) *Attorney, Agent, or Firm* — Ryan, Mason & Lewis, LLP

(57) ABSTRACT

Methods, systems, and computer program products for identifying microservices from a monolith application through static code analysis are provided herein. A method includes performing a static code analysis to extract multiple features of a monolith application; partitioning code elements of the monolith application into multiple groups using an agglomerative clustering process, wherein the agglomerative clustering process is based on the extracted multiple features and a set of clustering metrics; obtaining at least one weight corresponding to one or more of: at least one of the multiple features and at least one of the multiple groups; adjusting the groups based on the at least one weight; generating a list of candidate microservices for the monolith application, wherein each candidate microservice in the list corresponds to a different one of the adjusted multiple groups; and outputting the list of candidate microservices to at least one of a system and a user.

20 Claims, 9 Drawing Sheets

(56) References Cited

U.S. PATENT DOCUMENTS

| | | | |
|---|---|---|---|
| 10,936,291 B1* | 3/2021 | Gamliel | G06F 8/72 |
| 11,467,826 B1 | 10/2022 | Chawda et al. | |
| 2003/0005258 A1* | 1/2003 | Modha | G06F 18/211 |
| | | | 712/1 |
| 2017/0187785 A1 | 6/2017 | Johnson et al. | |
| 2017/0364434 A1 | 12/2017 | Kairali et al. | |
| 2018/0365008 A1 | 12/2018 | Chandramouli et al. | |
| 2019/0108067 A1* | 4/2019 | Ishikawa | H04L 41/50 |
| 2019/0116047 A1 | 4/2019 | Struttmann et al. | |
| 2019/0138428 A1* | 5/2019 | Sumitomo | G06F 11/3616 |
| 2019/0250912 A1 | 8/2019 | Gavisiddappa Kodigenahalli et al. | |
| 2019/0279038 A1 | 9/2019 | Nicol | |
| 2019/0361686 A1 | 11/2019 | Gnazdowsky et al. | |
| 2020/0042315 A1 | 2/2020 | Gupta | |
| 2020/0042328 A1* | 2/2020 | Gupta | H04L 67/34 |
| 2020/0097390 A1 | 3/2020 | Gunter | |
| 2020/0160121 A1* | 5/2020 | Parasrampuria | G06F 18/24147 |
| 2020/0192690 A1 | 6/2020 | Gupta et al. | |
| 2020/0218634 A1 | 7/2020 | Jones et al. | |
| 2020/0401386 A1 | 12/2020 | Punathil et al. | |
| 2021/0011688 A1 | 1/2021 | Sasidharan et al. | |
| 2021/0124577 A1 | 4/2021 | Gupta | |
| 2021/0232390 A1 | 7/2021 | Hwang et al. | |
| 2022/0060431 A1 | 2/2022 | Vadayadiyil Raveendran et al. | |
| 2022/0188104 A1 | 6/2022 | Wan et al. | |
| 2022/0301173 A1 | 9/2022 | Cheng et al. | |

FOREIGN PATENT DOCUMENTS

| | | |
|---|---|---|
| CN | 113204465 | 8/2021 |
| WO | 2019209231 A2 | 10/2018 |
| WO | 2021064058 A1 | 4/2021 |

OTHER PUBLICATIONS

Mazlami, Genc, Jürgen Cito, and Philipp Leitner. "Extraction of microservices from monolithic software architectures." 2017 IEEE International Conference on Web Services (ICWS). IEEE, 2017.

Fritzsch, Jonas, et al. "From monolith to microservices: A classification of refactoring approaches." International Workshop on Software Engineering Aspects of Continuous Development and New Paradigms of Software Production and Deployment. Springer, Cham, 2018.

De Alwis, Adambarage Anuruddha Chathuranga, et al. "Function-splitting heuristics for discovery of microservices in enterprise systems." International Conference on Service-Oriented Computing. Springer, Cham, 2018.

System and Method for Cognitive Microservices Recommendations, IP.com Prior Art Database, Nov. 30, 2020.

Diluting Outliers for Refactoring Monolith Application through Attributed Graph Embeddings, IP.com Prior Art Database, Sep. 7, 2020.

System and Method for Identifying Critical Business Cases from a Monolith Application being Modernized with Optimized Business Value, IP.com Prior Art Database, Aug. 16, 2020.

Creating composite UI based on microservices, Microsoft Corporation, https://docs.microsoft.com/en-us/dotnet/architecture/microservices/architect-microservice-container-applications/microservice-based-composite-ui-shape-layout, last accessed Nov. 30, 2021, published Sep. 15, 2021.

Jackson Cam, Micro Frontends, https://martinfowler.com/articles/micro-frontends.html, last accessed Nov. 30, 2021, published Jun. 19, 2019.

Geers, Michael,What are Micro Frontends?, https://micro-frontends.org/, last accessed Nov. 30, 2021.

Gill, Navdeep Singh, Understanding Integration of dot js Frameworks to Micro Frontend, available at https://www.xenonstack.com/blog/js-integration-micro-frontend, last accessed Nov. 30, 2021, published Mar. 21, 2019.

Witkowski, Robert, UI in Microservices World—Micro Frontends pattern and Web Components, available at https://medium.com/@witek1902/ui-in-microservices-world-micro-frontends-pattern-and-web-components-23607a569363, last accessed Nov. 30, 2021, published Dec. 13, 2018.

What is Micro Frontend and How it Provides Benefits to the Startups?, Techuz InfoWeb Private Limited, https://www.techuz.com/blog/what-is-micro-frontend-and-how-it-provide-benefits-to-the-startups/, last accessed Nov. 30, 2021, published Feb. 28, 2018.

Nunes, Luís, Nuno Santos, and António Rito Silva. "From a Monolith to a Microservices Architecture: An Approach Based on Transactional Contexts." European Conference on Software Architecture. Springer, Cham, 2019.

IBM: List of IBM Patents or Patent Applications Treated as Related, Dec. 16, 2021, pp. 1-2.

Desai, Utkarsh Milind et al., Pending U.S. Appl. No. 17/543,312, filed Dec. 6, 2021, titled "Multi-Objective Driven Refactoring of a Monolith Application Using Reinforcement Learning".

Sridhara, Giriprasad, et al., Pending U.S. Appl. No. 17/489,280, filed Sep. 29, 2021, titled "Translating Clusters of a Monolith Application to Microservices".

Tamilselvam, Srikanth Govindaraj et al., Pending U.S. Appl. No. 17/467,690, filed Sep. 7, 2021, titled "Constraints-Based Refactoring of Monolith Applications Through Attributed Graph Embeddings".

Monte Carlo tree search, https://en.wikipedia.org/w/index.php?title=Monte_Carlo_tree_search&oldid=1050627850 (last visited Dec. 6, 2021.

Harms, Holger, Collin Rogowski, and Luigi Lo Iacono. "Guidelines for Adopting Frontend Architectures and Patterns in Microservices-based Systems." Proceedings of the 2017 11th Joint Meeting on Foundations of Software Engineering. 2017.

Amiri, Mohammad Javad. "Object-aware Iidentification of Microservices." 2018 IEEE International Conference on Services Computing (SCC). IEEE, 2018.

Ren, Zhongshan, et al. "Migrating Web Applications from Monolithic Structure to Microservices Architecture." Proceedings of the Tenth Asia-Pacific Symposium on Internetware. 2018.

Jin, Wuxia, et al. "Functionality-oriented Microservice Extraction Based on Execution Trace Clustering." 2018 IEEE International Conference on Web Services (ICWS) IEEE, 2018.

Yang, Runzhe, et al., "A generalized algorithm for multi-objective reinforcement learning and policy adaptation." arXiv preprint arXiv:1908.08342, Aug. 21, 2019.

Baresi, Luciano, Martin Garriga, and Alan De Renzis. "Microservices Identification Through Interface Analysis." European Conference on Service-Oriented and Cloud Computing. Springer, Cham, 2017.

Liang, Eric, et al. "RLlib: Abstractions for distributed reinforcement learning." International Conference on Machine Learning. PMLR, Jul. 3, 2018.

Desai U, Bandyopadhyay S, Tamilselvam S. Graph neural network to dilute outliers for refactoring monolith application. InProceedings of 35th AAAI Conference on Artificial Intelligence (AAAI'21) Feb. 7, 2021.

Bandyopadhyay S, Lokesh N, Murty MN. Outlier aware network embedding for attributed networks. In Proceedings of the AAAI conference on artificial intelligence Jul. 17, 2019 (vol. 33, No. 01, pp. 12-19).

Van Moffaert, Kristof, et al. "Multi-objective reinforcement learning using sets of pareto dominating policies." The Journal of Machine Learning Research 15.1, Jan. 1, 2014, pp. 3483-3512.

Jaderberg, Max, et al. "Reinforcement learning with unsupervised auxiliary tasks." arXiv preprint arXiv:1611.05397 Nov. 16, 2016.

James, Steven, et al., "An analysis of monte carlo tree search." Thirty-First AAAI Conference on Artificial Intelligence, Feb. 2017.

Chen, Xi, et al. "Meta-learning for multi-objective reinforcement learning." 2019 IEEE/RSJ International Conference on Intelligent Robots and Systems (IROS). IEEE, Oct. 7, 2019.

Abdullah, Muhammad et. al., "Unsupervised Learning Approach for Web Application Auto-Decomposition into Microservices", published in Journal of Systems and Software, Feb. 2019.

(56) References Cited

OTHER PUBLICATIONS

International Search Report and Written Opinion from International Application No. PCT/CN2022/124669, 9 pages, dated Dec. 15, 2022.

Alexander Krause, "Microservice Decomposition via Static and Dynamic Analysis of the Monolith", May 19, 2020 IEEE (Year: 2020).

* cited by examiner

IDENTIFYING MICROSERVICES FOR A MONOLITH APPLICATION THROUGH STATIC CODE ANALYSIS

BACKGROUND

The present application generally relates to information technology and, more particularly, to modernizing applications.

Organizations are increasingly attempting to refactor monolith application architectures into microservice architectures as part of their journey to the cloud. Generally, refactoring a microservice architecture involves partitioning the software components into finer modules such that development of the modules can happen independently. Microservice architectures provide natural benefits when deployed in the cloud since resources can be allocated dynamically to necessary components based on demand.

SUMMARY

In one embodiment of the present disclosure, techniques for identifying microservices for a monolith application through static code analysis are provided. An exemplary computer-implemented method includes performing a static code analysis to extract multiple features of a monolith application; partitioning code elements of the monolith application into multiple groups using an agglomerative clustering process, wherein the agglomerative clustering process is based on the extracted multiple features and a set of clustering metrics; obtaining at least one weight corresponding to one or more of: at least one of the multiple features and at least one of the multiple groups; adjusting the multiple groups based at least in part on the at least one weight; generating a list of candidate microservices for the monolith application, wherein each candidate microservice in the list corresponds to a different one of the adjusted multiple groups; and outputting the list of candidate microservices to at least one of a system and a user.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Figure 1:
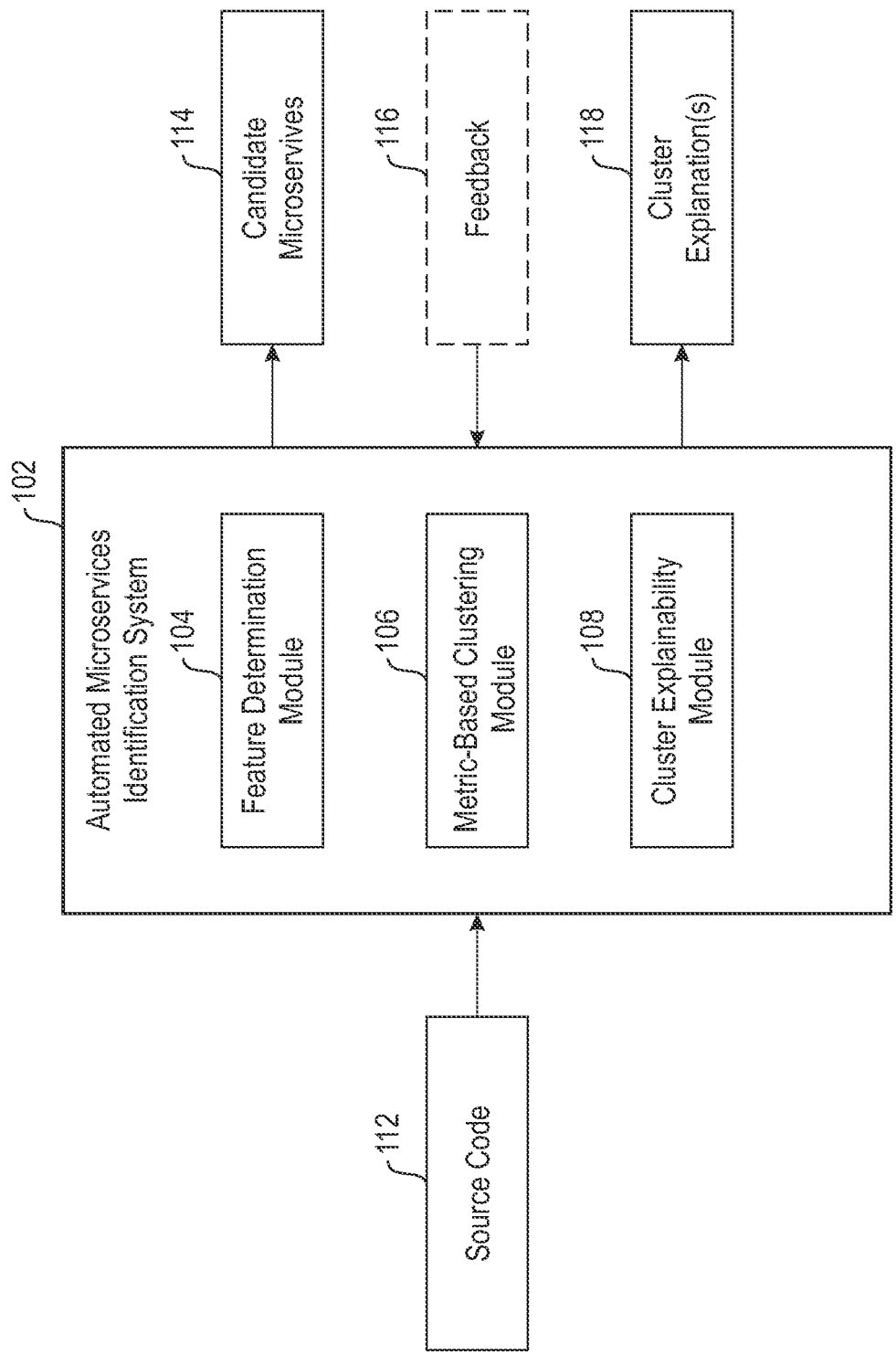
FIG. 1 is a diagram illustrating a system architecture in accordance with exemplary embodiments.

A monolith application generally refers to an application that is built as a single unit. For example, a monolith application may include a database, a client-side user interface, and a server-side application server, where all of the functions are managed and served in one place. Accordingly, monolith applications often have a large and complex code base. Developers making changes or updates to the application must all access the same code base.

In a microservice architecture, the application is broken down into a number of microservices, where each microservice carries out a process of the application. The microservices can communicate with each other via application programming interfaces (APIs). In contrast to monolith architectures, each microservice can be updated or deployed independently.

Application refactoring refers to a process of rewriting one or more components of an application, for example, in order to make the application cloud enabled, or to convert the application from a monolith application to an application that uses a microservice architecture.

There are many technological challenges associated with refactoring monolith application. For example, users might not be willing to give access to their application runtime or might not be ready to share the application code. Also, a bottom-up approach to refactoring an application is also difficult since it is harder to understand domain model boundaries on already implemented applications. Generally, it is easier to define interfaces and identify bounded context, and then design microservices. Obtaining and incorporating user feedback throughout the refactoring stages is also difficult. Further, there is a lack of control in clustering of classes, which can lead to inadequate explanations on why certain classes are grouped together.

It is desirable to have control over the microservices as the current implementation of an application may differ from the actual business context planned. Also, strangler patterns are often used to modernize module by module. Therefore, it is important to incorporate feedback of subject matter experts (SMEs), for example, on changes and/or selection of modules.

As described herein, exemplary embodiments of the present disclosure include techniques for an agglomerative clustering process that generates hierarchical cluster representations (e.g., dendrograms) of a monolith application in a controllable and explainable manner. One or more embodiments provide the hierarchical cluster representation based on weights for features of the monolith application that are adjustable based on one or more clustering metrics. Also, the hierarchical cluster representation can be used to provide insights into the importance of particular features, cluster groups that come together to form candidate microservices, and properties of the dendrograms that explain how classes of the monolith were separated.

Additionally, one embodiment may include providing an interactive system that assists in determining microservices for a monolith application using static analysis. Such embodiments may include, for example, infusing structural, semantic, and behavioral features, and performing metrics-driven iterations for grouping code elements of the monolith application. Additionally, in some embodiments, the grouping of classes is explainable based on dendrograms, and the grouping of classes is controllable by at least one of: varying weights of the features and/or selecting particular hierarchy of clusters (e.g., based on user input).

FIG. 1 shows a diagram illustrating a system architecture, according to an exemplary embodiment of the present disclosure. The FIG. 1 example includes an automated microservices identification system 102 comprising a feature determination module 104, a metric-based clustering module 106, and a cluster explainability module 108. The automated microservices identification system 102 obtains source code 112 of a monolith application.

The feature determination module 104 performs a static code analysis of the source code 112 to determine multiple features of the monolith application. For example, the static analysis may be used to identify interactions between different code elements (e.g., classes), path cooccurrence of code elements, transactions, and/or affinity of different code elements. For example, the feature determination module 104 can compute inter-code element usage (ICU), path code element-cooccurrence (PCC), transactions (TR), and code element affinity (CA), as explained in more detail elsewhere herein.

The metric-based clustering module 106 uses the results of the feature determination module 104 to perform an agglomerative clustering process to generate groups of code elements. The groups of code elements can be presented to the user in the form of candidate microservices 114, for example. Optionally, the metric-based clustering module 106 can incorporate feedback 116 from a user, for example, in the agglomerative clustering process. For example, the feedback may specify certain criteria for grouping the code elements of the monolith application or specify certain metrics that should be considered when performing the agglomerative clustering process. The metric-based clustering module 106 may also generate dendrograms (e.g., a view showing hierarchy of clusters) based on the agglomerative clustering process and, possibly, the feedback 116.

The cluster explainability module 108, in some embodiments, generates one or more cluster explanations 118 based on the results of the metric-based clustering module 106. The one or more cluster explanations 118 may be generated based on the dendrograms, for example.

According to some embodiments, code elements can be mapped to microservices based on the programming languages of the code elements. For object-oriented languages (e.g., Java, C++, C#) modules may include classes and interfaces, for example, and for procedural languages (e.g., COBOL, PL/1) modules includes subroutines and programs, for example. Examples of semantic features may include mapping of identifiers in the code to a feature space, e.g., using one or more machine learning algorithms. In some embodiments, mapping of identifiers in the code to a feature space additionally or alternatively be performed using one or more rules. As an example, COBOL program names may have a pattern such that some substring in the name maps to an application functionality indicator. Entry points may include service interfaces exposed by the application to be invoked by other applications, the user interface, or by users, for example. Examples of entry points include REST API endpoints, SOAP/WSDL services, and COBOL transaction entry points.

By way of example, assume an application comprises a Java monolith application. According to some embodiments, a process for identifying microservices corresponding to the application, where a code element corresponds to a Java Class File may include the following steps:

1. Computing and normalizing an inter-Code element usage (ICU) matrix.
2. Extracting a call graph based on an identified set of entry-points.
3. Identifying unique call-flow paths within the call graph.
4. Extracting and normalizing a path code element cooccurrence (PCC) matrix based on the call-flow paths.
5. Optionally, identifying and extracting one or more additional feature ($F_i$) matrices.
6. Computing a weighted combination of ICU and PCC using the following equation: $F_w = w_0 \times ICU + w_1 \times PCC + w_i \times F_i$, where $w_0$, $w_1$, and $w_i$ correspond to configurable weights.
7. Applying agglomerative clustering on the matrix, $F_w$.

Figures 2A, 2B:
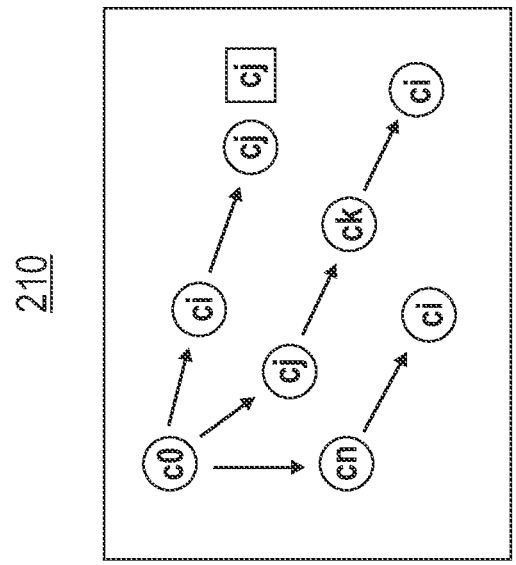
FIG. 2A shows an example of a usage matrix in accordance with exemplary embodiments.
FIG. 2B shows an example of a path co-occurrence matrix in accordance with exemplary embodiments.

FIG. 2A shows an example of an ICU matrix 200 in accordance with exemplary embodiments, and FIG. 2B shows an example of a PCC matrix 210 in accordance with exemplary embodiments. The example ICU matrix 200 shows usage information for a number of classes (i.e., c0, c1, . . . , ci, . . . , cj). The example ICU matrix 200 indicates, for example, c0 calls APIs in c1 3 times and ci calls APIs in cj 2 times. The normalization factor may include the following: a global normalization factor (Global: Z=max(ICU)), a local normalization factor (Local: $Z_i$=max(ICU[i])), and a symmetric normalization factor (Symmetric: $Z_{ij}$=max(ICU[i,:], ICU[:,j])). Generally, normalization helps adjust values to common scales such as when certain programs have higher interaction compared to the average interaction between other programs.

The PCC matrix 210 in FIG. 2B shows call paths for classes in the ICU matrix 200. Specifically, the PCC matrix 210 indicates that c0 and ci occur in the same path three times, (i.e., PCC(0, i)=3). The PCC matrix 210 also indicates PCC(i, j)=2, PCC(j, i)=2.

A metric-based microservice generation process, in some embodiments, can include:

1. Identifying a set of metrics of interest.
2. Identifying a set of high-usage classes, sorted by usage.
3. Removing the top i classes from the set of high-usage classes for i=1, n (where n is the number of clusters), and applying step 4 on the remaining classes.
4. Performing clustering by:
   a) Selecting the submatrices from the feature matrices based on the remaining classes
   b) Computing the weighted matrix $F_w = w_0 F_0 + w_1 F_1 + \ldots + W_n F_n$
   c) Applying agglomerative clustering and generate a dendrogram d) Computing the metric values of the root node for the set of metrics
e) Computing the metric values of the children nodes
f) If metrics(children)>ß*metrics(parent), split the cluster 0<ß<1
g) Repeat e) and f) while no clusters can be split further
h) Save the metric values, clusters and i as the best result so far
5. Repeat (3) and (4) while $$\text{metrics}(i) * \left(\frac{1}{\sqrt{i}}\right) > \text{metrics}(i-1) * \left(\frac{1}{\sqrt{i-1}}\right).$$

It is noted that in the above process B is a hyper-parameter that can be used to decide whether to split the cluster.

Optionally, the above process can also include a step of enabling forced clustering based on user input, e.g., from a SME.

Figure 3:
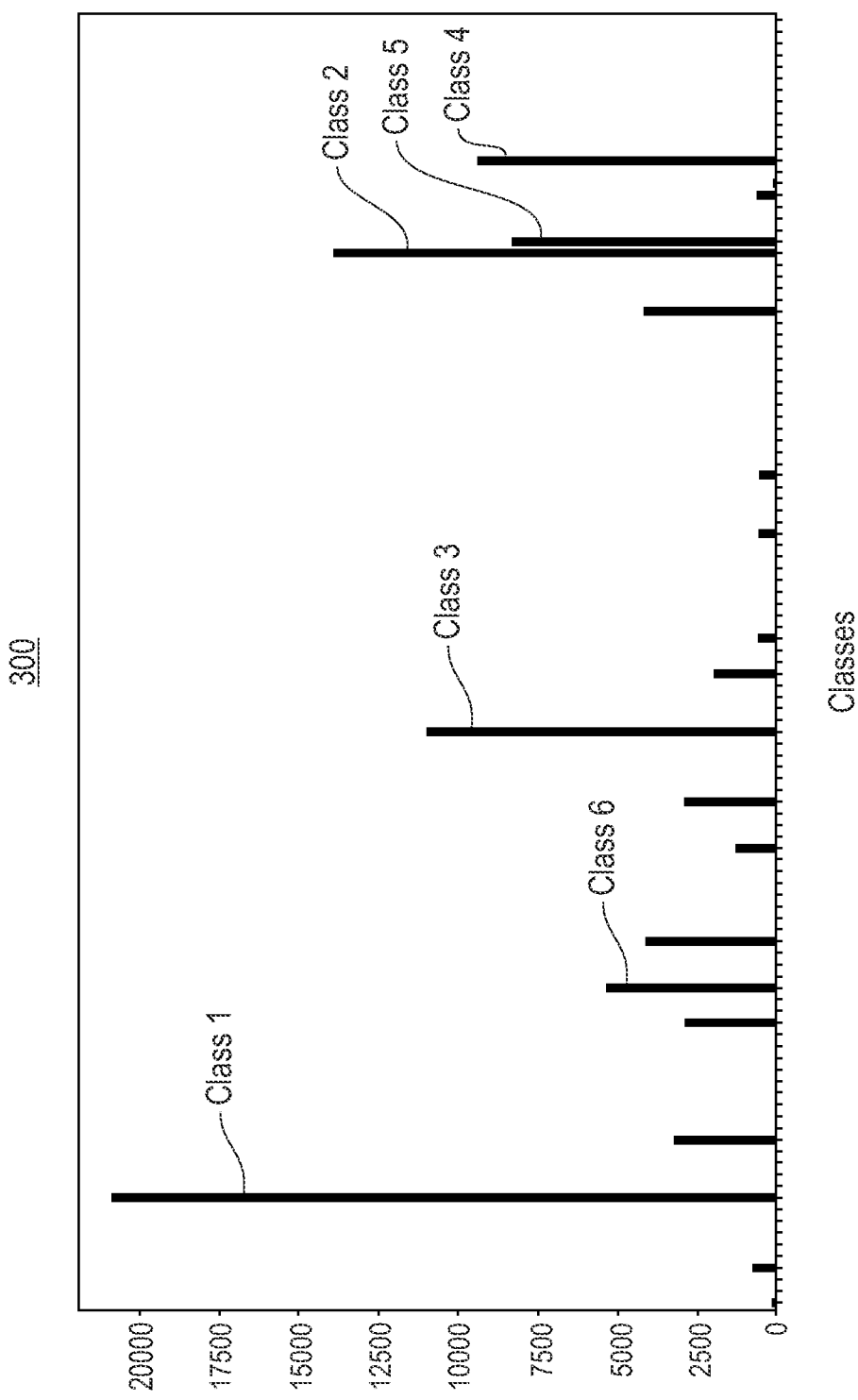
FIG. 3 is a graph showing class usage information of a monolith application in accordance with exemplary embodiments.

Referring now to FIG. 3, this figure shows a bar graph 300 of class usage information of a monolith application in accordance with exemplary embodiments. The x-axis of the graph 300 corresponds to the classes of the monolith application, and the y-axis corresponds to the usage of each class. In this example, classes 1-6 have the highest usage. The usage information may be used to cluster the classes in an explainable and controllable manner based in part on dendrogram representations, such as by computing an affinity-based weighted matrix, selecting weights and clustering parameters (e.g., via an automated and/or guided process), and leveraging characteristics of agglomerative clustering to separate utilities and rarely used classes in the monolith application.

For example, the classes in graph 300 can be sorted by usage, and the most used classes can be removed while performing the clustering in step 4 of the metric-based microservice generation process described above.

Figure 4:
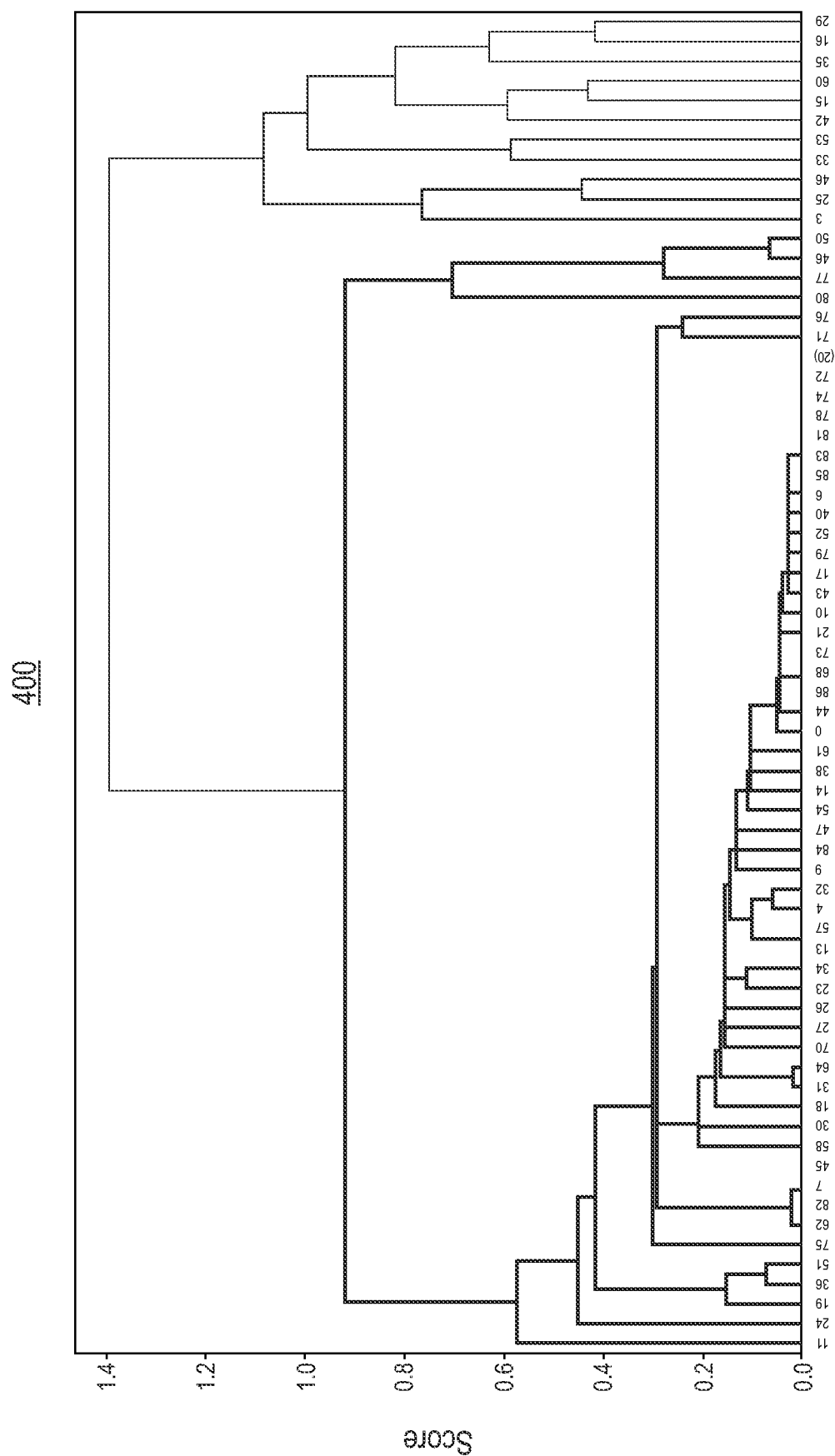
FIG. 4 shows a dendrogram generated for the monolith application associated with FIG. 3 in accordance with exemplary embodiments.

FIG. 4 shows a dendrogram 400 generated for the monolith application described in conjunction with FIG. 3, in accordance with exemplary embodiments. The values on the x-axis correspond to indices of the classes, and the y-axis corresponds to a metric-based score. In this example, the metrics-based score is based on the ICU and the PCC. In the FIG. 4 example, it is assumed a number of classes have been removed from the list of classes based on the usage (e.g., classes 1-6) shown in graph 300, and that w0 is assigned a value of 0.5 and w1 is assigned a value of 0.5.

Figure 5:
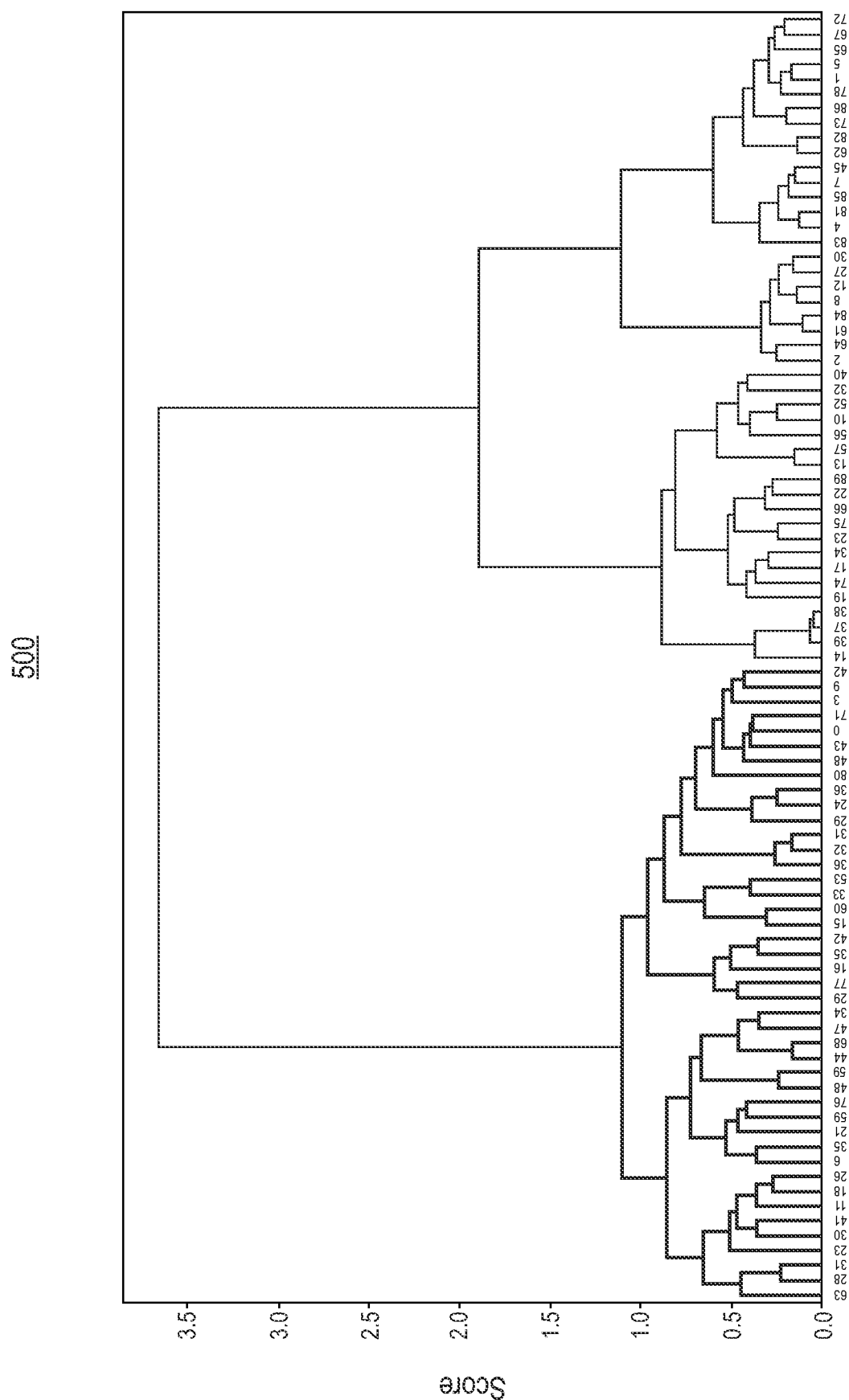
FIG. 5 shows a modified version of the dendrogram from FIG. 4 in accordance with exemplary embodiments.

FIG. 5 shows another dendrogram 500 that has been updated relative to dendrogram 400 to consider another metric, in accordance with exemplary embodiments. For example, the additional metric may be an affinity metric, and the weights applied to the metrics may be updated as follows: w0=0.3, w1=0.4, and w2=0.3, where w2 is applied to the affinity matrix. Thus, the dendrogram 500 shows the score based according to the assigned weights and the metrics.

It is to be appreciated a number of different metrics may be considered when clustering the code elements including, for example:

1. Data independence: Measures percentage of single database accesses across partitions.
2. Transaction independence: Measures percentage of a sequence of database accesses (transactions) across partitions.
3. Functional independence: Measure overlap of boundaries of domain model (generally indicates level of independence of bounded context).
4. Semantic relatedness: Measures semantic relatedness of classes across the recommended partitions.
5. Modularity: Measures the strength of division of a network into modules (e.g., partitions, community).
6. Cyclomatic complexity: Measures code complexity of individual implemented services.
7. Data dependency: Measures dependency of data objects among classes and methods.
8. Call dependencies (runtime): Class call path and dependencies (temporal and higher order).
9. Inter-partition call volume (runtime): Inter-partition call volume.
10. Business Context: Measures business context purity and involvement of a partition.
11. Self-encapsulation: Number of interface classes exposed.

By way of example, the following table provides explanations for at least some of the metrics that can be considered when clustering the code elements:

| Quality Aspect | Metric | Applicability | Description |
|---|---|---|---|
| Coupling | Data independence | Overall | Measures percentage of database tables that are accessed by only one partition |
| | Transaction independence | Overall | Measures percentage of DB transactions call sequence that span across partitions |
| | Data Locality | Individual Partition | Measures ratio of data objects scoped within a partition with objects escaping the partition |
| | Inter-partition call volume (runtime) | Pairwise | Inter-partition call volume |
| | Modularity | Overall | Measures the strength of division of a network into modules (partitions, community). Effectively, captures class call path and dependencies (temporal and higher-order, static/runtime) |
| | Self-encapsulation | Individual Partition | Number of Interface classes exposed |
| Domain Redundancy | Functional independence | Overall | Measures the number of partitions that contribute to a sub domain functionality |
| | Name based Semantic Relatedness | Pairwise | Measures semantic relatedness of classes across the recommended partitions |

| Quality Aspect | Metric | Applicability | Description |
| --- | --- | --- | --- |
| Effort | Cyclomatic complexity | Individual Partition | Measures code complexity of the individual implemented services. |
| Cohesion | Cohesion of Classes | Individual Partition | Measures the inter class usage within a partition |

Some embodiments can further include at least partially converting the candidate microservices of the monolith application into deployable microservices (e.g., a monolith web API can be automatically converted to a REST (representational state transfer) API).

Figure 6:
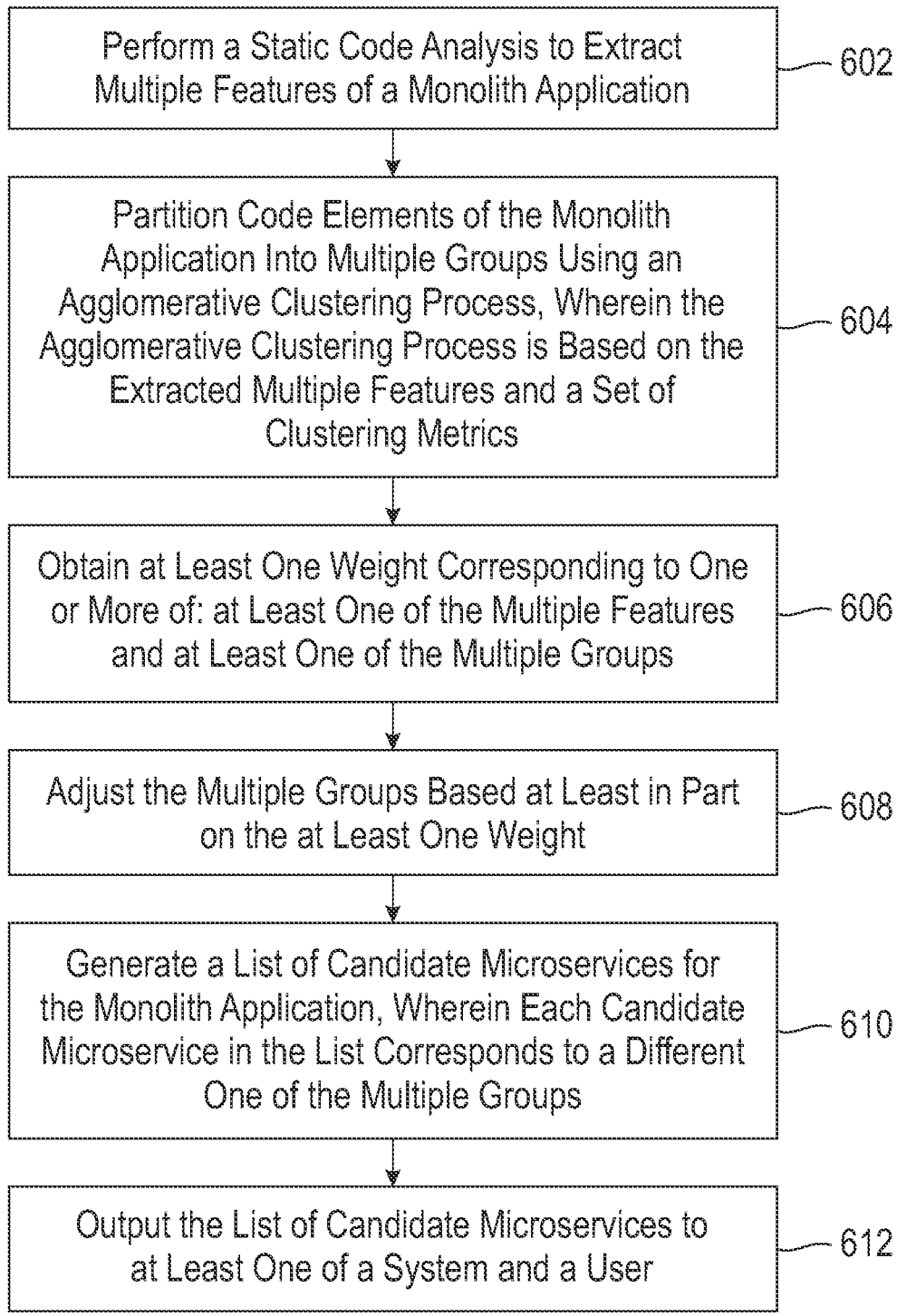
FIG. 6 is a flow diagram illustrating techniques for identifying microservices for a monolith application in accordance with exemplary embodiments.

FIG. 6 is a flow diagram illustrating techniques for identifying microservices for a monolith application in accordance with exemplary embodiments. Step 602 includes performing a static code analysis to extract multiple features of a monolith application. Step 604 includes partitioning code elements of the monolith application into multiple groups using an agglomerative clustering process, wherein the agglomerative clustering process is based on the extracted multiple features and a set of clustering metrics. Step 606 includes obtaining at least one weight corresponding to one or more of: at least one of the multiple features and at least one of the multiple groups. Step 608 includes adjusting the multiple groups based at least in part on the at least one weight. Step 610 includes generating a list of candidate microservices for the monolith application, wherein each candidate microservice in the list corresponds to a different one of the adjusted multiple groups. Step 612 includes outputting the list of candidate microservices to at least one of a system and a user.

The process may also include automatically generating an explanation of the partitioning for the code elements in at least one of the groups; and outputting the explanation to at least one of the system and the user. The partitioning may include generating a dendrogram representation of the code elements based at least in part on the set of clustering metrics, wherein the generated explanation is based on the dendrogram representation. The partitioning may include: assigning a respective weight to each of the extracted multiple features based at least in part on the set of clustering metrics. The multiple features may include at least one structural feature corresponding to at least one of: interdependencies between at least two of the code elements; and one or more properties of at least one of the code elements. The multiple features may include at least one semantic feature corresponding to at least one of: an affinity between at least two of the code elements, wherein the affinity is based on at least one of: one or more comments associated with the code elements and one or more identifiers associated with one or more corresponding portions of the code elements. The multiple features may include at least one behavioral feature corresponding to at least one of: usage information between at least two of the code elements; and path cooccurrence information for at least one two of the code elements. The set of clustering metrics may be specified by the user. The at least one weight may be provided as input from the user, and wherein the adjusting comprises dividing one of the multiple groups into two or more groups.

The techniques depicted in FIG. 6 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 6 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 7:
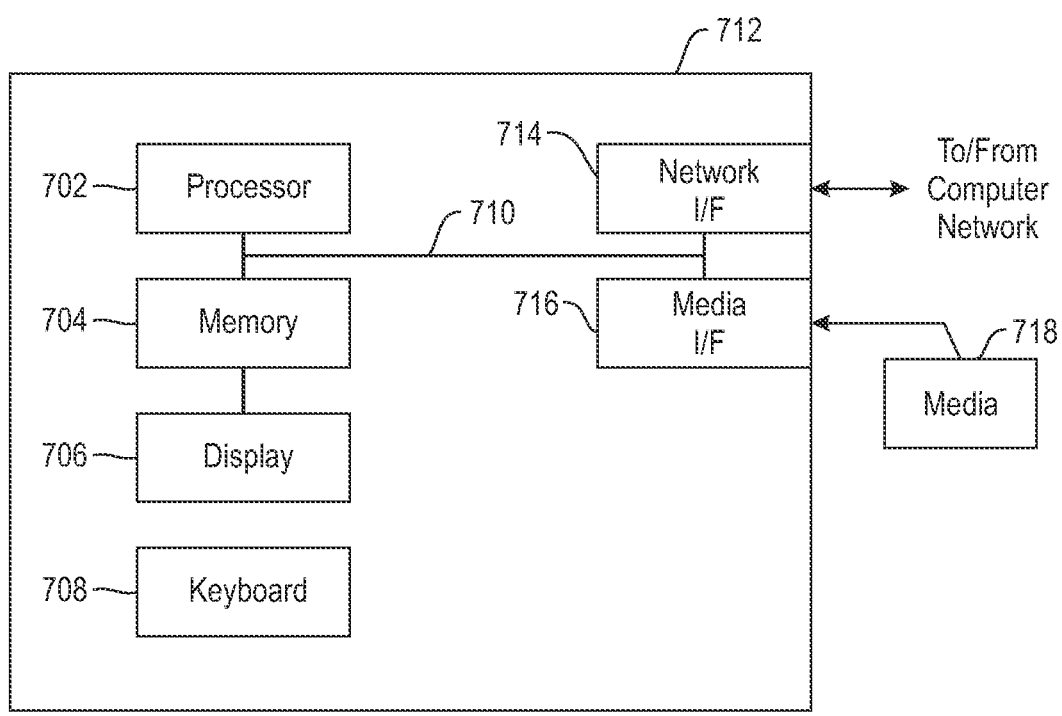
FIG. 7 is a system diagram of an exemplary computer system on which at least one embodiment of the present disclosure can be implemented.

Additionally, an embodiment of the present disclosure can make use of software running on a computer or workstation. With reference to FIG. 7, such an implementation might employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 702, memory 704, and input/output interface such as display 706 and keyboard 708 can be interconnected, for example, via bus 710 as part of a data processing unit 712. Suitable interconnections, for example via bus 710, can also be provided to a network interface 714, such as a network card, which can be provided to interface with a computer network, and to a media interface 716, such as a diskette or CD-ROM drive, which can be provided to interface with media 718.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 702 coupled directly or indirectly to memory elements 704 through a system bus 710. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 708, displays 706, pointing devices, and the like) can be coupled to the system either directly (such as via bus 710) or through intervening I/O controllers (omitted for clarity).

Network adapters such as network interface 714 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 712 as shown in FIG. 7) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 702. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
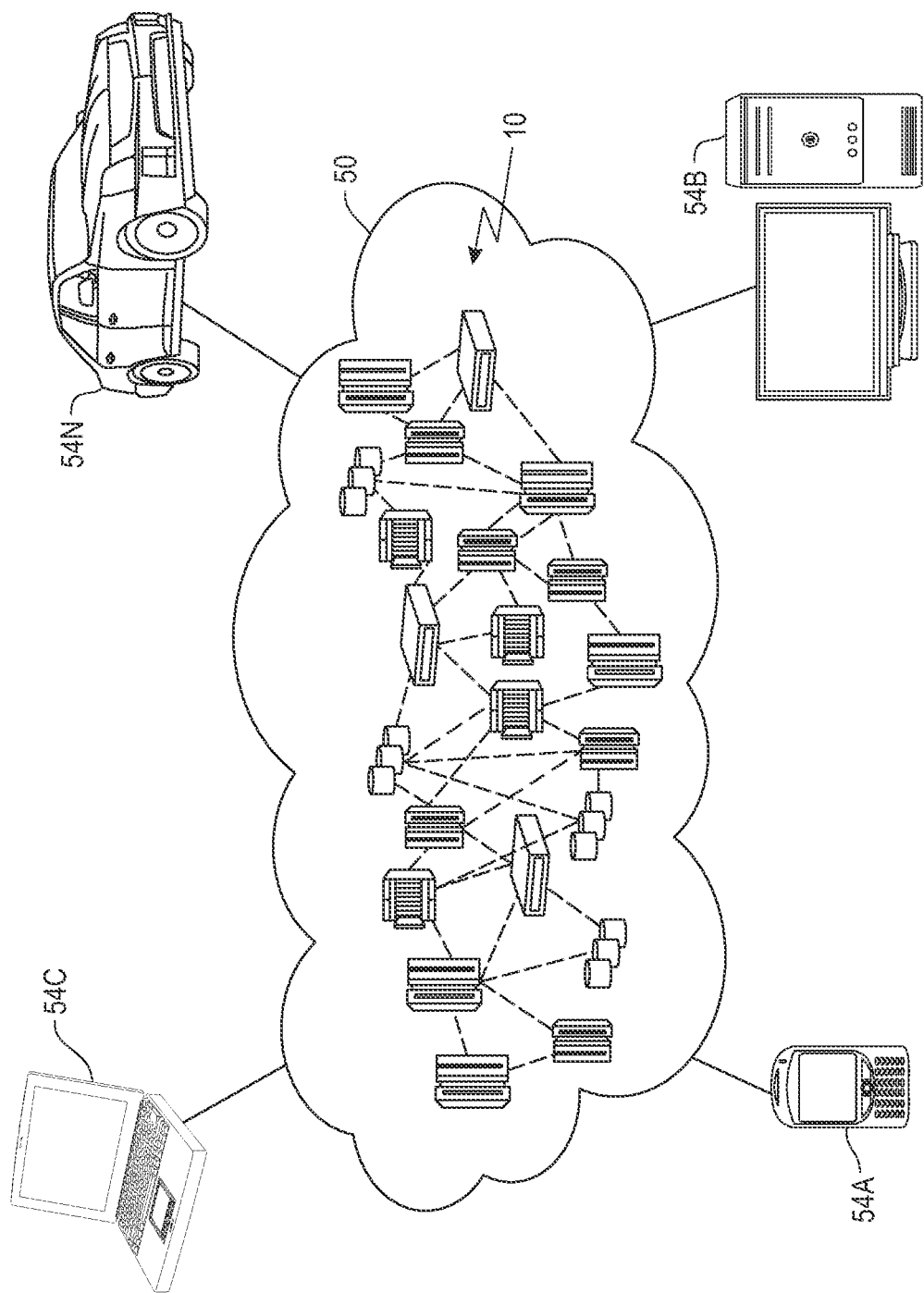
FIG. 8 depicts a cloud computing environment in accordance with exemplary embodiments.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
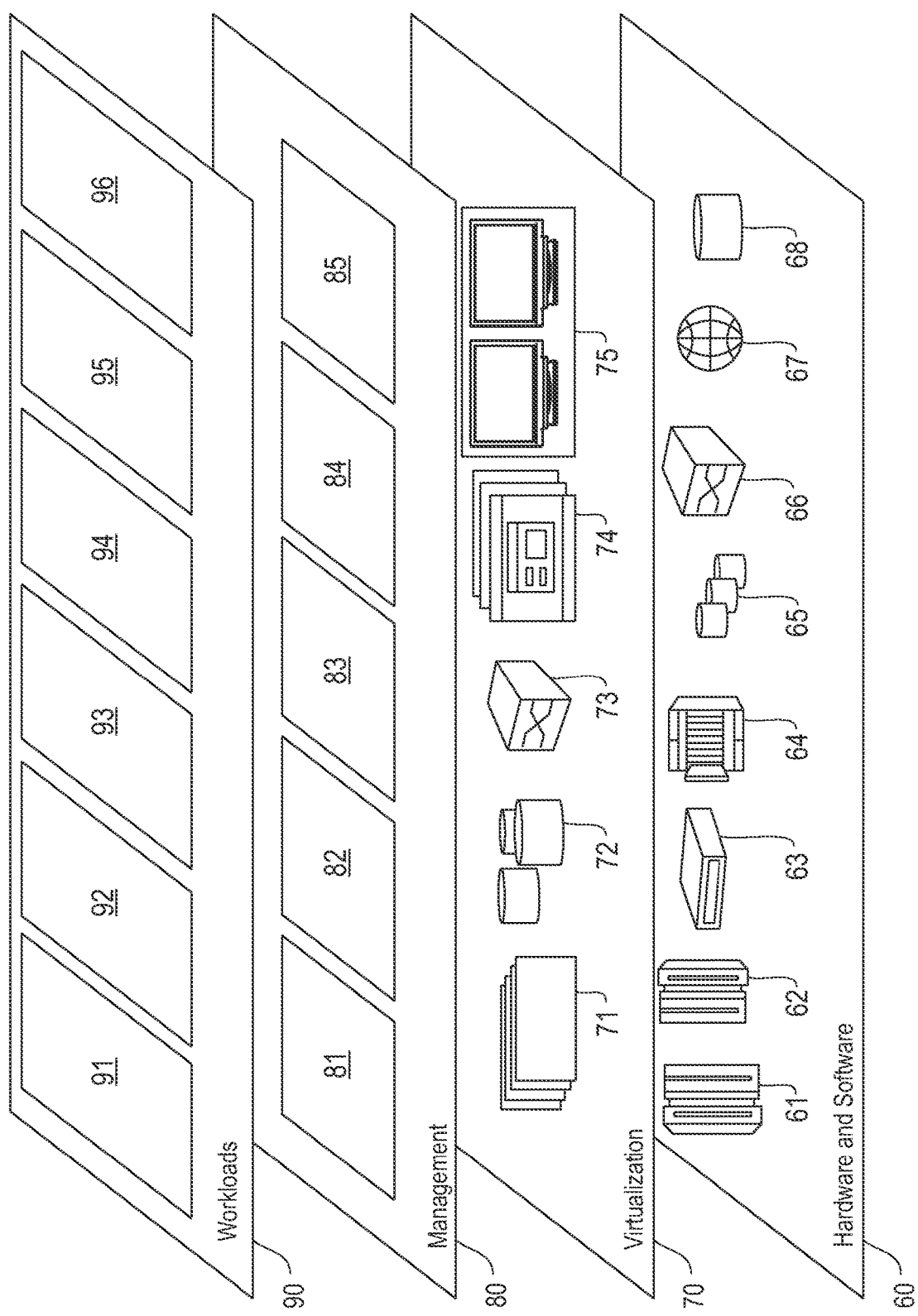
FIG. 9 depicts abstraction model layers in accordance with exemplary embodiments.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and identifying microservices 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, converting a monolith application into a microservice architecture by identifying clusters of code elements in a controllable and explainable manner.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   performing a static code analysis to extract multiple features of a monolith application;
   identifying a set of code elements based on one or more of the extracted multiple features;
   iteratively performing a clustering process to partition the set of code elements of the monolith application into multiple groups until one or more criteria associated with a set of clustering metrics are satisfied, wherein, at each iteration, a different number of code elements is removed from the set of code elements, and the clustering process is performed on the remaining code elements in the set based at least in part on the extracted multiple features and a set of clustering metrics;

obtaining at least one weight corresponding to at least one clustering metric in the set of cluster metrics;

adjusting the multiple groups based at least in part on the at least one weight;

generating a list of candidate microservices for the monolith application, wherein each candidate microservice in the list corresponds to a different one of the adjusted multiple groups; and outputting the list of candidate microservices to at least one of a system and a user;

wherein the method is carried out by at least one computing device.

2. The computer-implemented method of claim 1, comprising:

automatically generating an explanation of the partitioning of the code elements for at least one of the multiple groups; and outputting the explanation to at least one of the system and the user.

3. The computer-implemented method of claim 2, wherein performing the clustering process comprises:

generating, for a given iteration, a dendrogram representation of the remaining code elements in the set of code elements based at least in part on the set of clustering metrics, wherein the generated explanation is based on the dendrogram representation.

4. The computer-implemented method of claim 1, wherein the portioned set of code elements is based on a respective weight that is assigned to each of the extracted multiple features based at least in part on the set of clustering metrics.

5. The computer-implemented method of claim 1, wherein the multiple features comprise at least one structural feature corresponding to at least one of:

interdependencies between at least two of the code elements in the set of code elements; and one or more properties of at least one of the code elements in the set of code elements.

6. The computer-implemented method of claim 1, wherein the multiple features comprise at least one semantic feature corresponding to at least one of:

an affinity between at least two of the code elements in the set of code elements, wherein the affinity is based on at least one of: one or more comments associated with the set of code elements and one or more identifiers associated with one or more corresponding portions of the set of code elements.

7. The computer-implemented method of claim 1, wherein the multiple features comprise at least one behavioral feature corresponding to at least one of:

usage information between at least two of the code elements in the set of code elements; and path cooccurrence information for at least two code elements in the set of code elements.

8. The computer-implemented method of claim 1, wherein the set of clustering metrics is specified by the user.

9. The computer-implemented method of claim 1, wherein the at least one weight is provided as input from the user, and wherein the adjusting comprises dividing one of the multiple groups into two or more groups.

10. The computer-implemented method of claim 1, wherein software is provided as a service in a cloud environment for performing at least a portion of the method.

11. A computer program product comprising a computer readable storage medium having program instructions embodied therewith, the program instructions executable by a computing device to cause the computing device to:

perform a static code analysis to extract multiple features of a monolith application;

identify a set of code elements based on one or more of the extracted multiple features;

iteratively performing a clustering process to partition the set of code elements of the monolith application into multiple groups until one or more criteria associated with a set of clustering metrics are satisfied, wherein, at each iteration, a different number of code elements is removed from the set of code elements, and the clustering process is performed on the remaining code elements in the set based at least in part on the extracted multiple features and a set of clustering metrics;

obtain at least one weight corresponding to at least one clustering metric in the set of cluster metrics;

adjust the multiple groups based at least in part on the at least one weight;

generate a list of candidate microservices for the monolith application, wherein each candidate microservice in the list corresponds to a different one of the adjusted multiple groups; and output the list of candidate microservices to at least one of a system and a user.

12. The computer program product of claim 11, wherein the program instructions executable by a computing device further cause the computing device to:

automatically generate an explanation of the partitioning of the code elements for at least one of the multiple groups; and output the explanation to at least one of the system and the user.

13. The computer program product of claim 12, wherein performing the clustering process comprises:

generating, for a given iteration, a dendrogram representation of the remaining code elements in the set of code elements based at least in part on the set of clustering metrics, wherein the generated explanation is based on the dendrogram representation.

14. The computer program product of claim 11, wherein performing the clustering process comprises:

generating, for a given iteration, a dendrogram representation of the remaining code elements in the set of code elements based at least in part on the set of clustering metrics, wherein the generated explanation is based on the dendrogram representation.

15. The computer program product of claim 11, wherein the multiple features comprise at least one structural feature corresponding to at least one of:

interdependencies between at least two of the code elements in the set of code elements; and one or more properties of at least one of the code elements in the set of code elements.

16. The computer program product of claim 11, wherein the multiple features comprise at least one semantic feature corresponding to at least one of:

an affinity between at least two of the code elements in the set of code elements, wherein the affinity is based on at least one of: one or more comments associated with the set of code elements and one or more identifiers associated with one or more corresponding portions of the set of code elements.

17. The computer program product of claim 11, wherein the multiple features comprise at least one behavioral feature corresponding to at least one of:
   usage information between at least two of the code elements in the set of code elements; and
   path cooccurrence information for at least two code elements in the set of code elements.

18. The computer program product of claim 11, wherein the set of clustering metrics is specified by the user.

19. The computer program product of claim 11, wherein the at least one weight is provided as input from the user, and wherein the adjusting comprises dividing one of the multiple groups into two or more groups.

20. A system comprising:
   a memory configured to store program instructions;
   a processor operatively coupled to the memory to execute the program instructions to:
      perform a static code analysis to extract multiple features of a monolith application;
      identify a set of code elements based on one or more of the extracted multiple features;
      iteratively performing a clustering process to partition the set of code elements of the monolith application into multiple groups until one or more criteria associated with a set of clustering metrics are satisfied, wherein, at each iteration, a different number of code elements is removed from the set of code elements, and the clustering process is performed on the remaining code elements in the set based at least in part on the extracted multiple features and a set of clustering metrics;
      obtain at least one weight corresponding to at least one clustering metric in the set of cluster metrics;
      adjust the multiple groups based at least in part on the at least one weight;
      generate a list of candidate microservices for the monolith application, wherein each candidate microservice in the list corresponds to a different one of the adjusted multiple groups; and
      output the list of candidate microservices to at least one of a system and a user.

* * * * *